United States Patent [19]

Schleich

[11] Patent Number: 4,801,441

[45] Date of Patent: Jan. 31, 1989

[54] METHOD FOR THE PREPARATION OF HIGH SURFACE AREA AMORPHOUS TRANSITION METAL CHALCOGENIDES

[75] Inventor: Donald Schleich, Brooklyn, N.Y.

[73] Assignee: The Polytechnic University, Brooklyn, N.Y.

[21] Appl. No.: 878,069

[22] Filed: Jun. 24, 1986

[51] Int. Cl.$^4$ .................. C01B 19/04; C01B 17/00
[52] U.S. Cl. .................. 423/509; 423/508; 423/561.1
[58] Field of Search .................. 423/509, 508, 561 R

[56] References Cited

U.S. PATENT DOCUMENTS

| | | | |
|---|---|---|---|
| 4,166,160 | 8/1979 | Chianelli et al. | 429/218 |
| 4,299,892 | 11/1981 | Dines et al. | 423/561 R |
| 4,308,171 | 12/1981 | Dines et al. | 423/561 R |
| 4,323,480 | 4/1982 | Dines et al. | 423/509 |

Primary Examiner—Gary P. Straub
Attorney, Agent, or Firm—Curtis, Morris & Safford

[57] ABSTRACT

A process for the direct synthesis of high surface area amorphous chalcogenides of transition metals of Group IV, V, VI and VII elements, comprising the steps of:

(1) forming a mixture of:
 (a) a halide of a said transition metal having the formula $MY_n$ where Y is chlorine, bromine, flurorine, or iodine, and n is 3, 4, 5 or 6, and
 (b) a source of chalcogen selected from compounds having the formula $(R)_3Si—X—Si(R)_3$ wherein R is alkyl having from 1-4 carbon atoms and X is sulfur, selenium or tellurium,
(2) reacting said mixture at a temperature of $-77°$ C. to $+160°$ C.;
(3) separating the transition metal chalcogenide from the reaction mixture; and
(4) washing said chalcogenide with an inert solvent to remove unreacted materials and the byproducts of the reaction.

The high surface area amorphous chalcogenides prepared according to the covalent exchange process of the invention are advantageously used in primary or secondary batteries, particularly lithium cells. They are of amorphous chemical structure as shown by X-ray, Raman and infrared analysis. Their small crystal size, high surface area, and freedom from oxygen and water contamination, make them high activity, rechargeable cathodes in lithium cells.

11 Claims, No Drawings

METHOD FOR THE PREPARATION OF HIGH SURFACE AREA AMORPHOUS TRANSITION METAL CHALCOGENIDES

BACKGROUND OF THE INVENTION

I. Field of The Invention

This invention relates generally to a method for producing high surface area amorphous transition metal chalcogenides. More specifically, the invention relates to a method for preparing high surface area amorphous molybdenum sulfides and selenides by a covalent exchange mechanism which produces novel compositions having advantageous properties for use in high energy density batteries or voltaic cells. The high surface area amorphous molybdenum chalcogenides of the invention are suitable for use as cathodes in battery cells because of their high activity, low weight, and rechargeable characteristics. They may also be used as catalysts, e.g., for hydrodesulfurization reactions.

II. Description of The Prior Art

The art has devoted substantial attention in recent years to the development of primary and secondary batteries for use in a variety of industrial, consumer and space age systems. Among the systems in development and which show substantial promise are those which comprise a light weight metal, e.g., an alkali metal, as anode, a nonaqueous, fused or solid electrolyte, and a transition metal chalcogenide as a cathode. Among the art describing such systems are U.S. Pat. Nos. 3,864,167, 3,791,867, and 3,988,164. The uses for such battery systems include electric vehicle propulsion, utility load leveling, and the standard automotive uses, i.e., engine starting, lighting, and ignition. Because of their high energy density, secondary lithium batteries comprising molybdenum chalcogenide as cathode are also of interest for space and military applications.

A number of transition metal sulfides and selenides (Group IV, V, VI and VII), and to a lesser extent oxides and tellurides, form a layered crystal structure reminiscent of that of graphite. Like graphite, these compounds are able to reversibly accommodate small molecules or ions between the layers, a process called intercalation. When charged ions are inserted and removed, the chalcogenide takes on a reversible net charge. So long as the intercalate fits without strain between the layers of the chalcogenide, this "reaction" occurs without physical change. It is this property that makes these materials useful as electrodes which must undergo many charge and discharge cycles without loss of physical integrity, as might be caused, for instance, by a change in crystal size or shape.

Lithium ions ($Li^+$) are attractive charge carriers for a number of fundamental reasons. This leads naturally to the consideration of chalcogenides as cathodes in battery systems with lithium anodes and wherein charge transport is by ionic conduction. Many chalcogenides possess fair electronic conductivity and can thus transmit the charge delivered by ionic transport to a current collector via electron flow.

The theoretical maximum capacity of the chalcogenide for $Li^+$ can be calculated from theory. The approach to that capacity and the speed with which it can be attained are functions of the physical state of the chalcogenide. Large planes, for instance, lead to inordinately long transport distances and times for the Li ions which can theoretically be accepted in the interior. Generally, very small particles are desirable. These present the maximum "edge" and minimum "interior" space. The art has recognized the value of transition metal chalcogenides, particularly molybdenum chalcogenides, as materials suited to the production of electrodes.

Pertinent U.S. patents illustrating the use of molybdenum chalcogenides in batteries are Dines et al., U.S. Pat. No. 4,323,480, Rao et al., U.S. Pat. No. 4,322,317, Sasu et al., U.S. Pat. No. 4,301,221, Dines et al., U.S. Pat. No. 4,299,892, Thompson et al., U.S. Pat. No. 4,237,204, Whittingham et al., U.S. Pat. No. 4,233,375, Haering et al., U.S. Pat. No. 4,224,390, Chianelli et al., U.S. Pat. No. 4,166,160, Pohl et al., U.S. Pat. No. 3,907,600, and Broadhead et al., U.S. Pat. No. 3,864,167.

The art has failed, however, to provide a satisfactory high activity, low weight, reversible, i.e., rechargeable, cathodic material which can be used in high current density batteries and which can be recharged at a rapid rate. For example, the titanium sulfide materials frequently used as cathodes have the disadvantage in that they have relatively low capacity as measured in watt-hours per unit of cathode material. It is believed that the titanium sulfide is limited by the ability of lithium ions in the electrolyte to intercalate into the cathode. Thus the cathode material after use becomes $Li_xTiS_2$ and x is believed to be less than 1 and as a practical matter only about 0.8 at a maximum. It is desirable that the value of x be greater than 1 and preferably as high as 4.

Molybdenum sulfide ($MoS_3$) is an alternative to titanium disulfide. When $MoS_3$ is used as a cathode in a lithium cell, $Li_xMoS_3$ is produced and x equals approximately 4. The difficulty with molybdenum sulfide as produced by prior art processes is that the rechargeability characteristic is unsatisfactory.

While molybdenum sulfide has received substantial attention from prior art workers, it is believed that the problem with its performance can be traced to its method of preparation. There are two known routes for the preparation of molybdenum sulfide: preparation via a thermal decomposition reaction, and preparation via a chemical decomposition reaction.

Thermal decomposition reactions typically take place at 200° C. or higher temperatures in the presence of ammonia-containing compounds. The high vapor pressure of ammonia over the reaction causes difficulties. Thermal decomposition methods for the production of molydenum sulfide involve the decomposition of ammonium thiomolybdate.

Chemical decomposition reactions are unsatisfactory because any oxygen impurities present react with the molybdenum sulfide or other chalcogenide to form an insulating oxide layer on the surface of that material. Such oxide layers are detrimental to the use of the material as a cathode. Such surface imperfections may be seen by surface inspection. Chemical decomposition reactions lock water into the structure and that has a similar insulating and deleterious effect with respect to cathode usage.

Typical of the methods for producing molybdenum sulfide via chemical decomposition reactions are the methods taught in Dines et al., U.S. Pat. No. 4,299,892. A disadvantage of this prior art method is that the molybdenum sulfide obtained is always molybdenum disulfide ($MoS_2$) and the compound is always obtained via an ionic-type precipitation. A further disadvantage of chemical decomposition reactions is that there is inevitable formation of an extra salt, such as, for example, lithium chloride (LiCl₄). Such byproduct salts must be removed by a washing process usually in an aqueous system and this introduces water and oxygen into the chalcogenide with resultant surface contamination and deleterious effect on performance as a cathode. The ionic precipitations are also time consuming, requiring as much as twelve to twenty-four hours to complete even at elevated temperatures. In addition, the ionic exchange described by Dines et al. failed to produce chalcogenides of different stoichiometry but rather produced only the dichalcogenides.

OBJECTS OF THE INVENTION

It is thus the primary object of this invention to provide a process for the preparation of transition metal chalcogenides which produces high surface area amorphous products for use in high energy density batteries.

It is a related and further object of this invention to provide a method for the production of high surface area amorphous chalcogenides, particularly molybdenum chalcogenides, and particularly molybdenum sulfides, which process does not involve either an oxidation or reduction reaction and therefore does not change the oxidation state of the metal precursor.

It is still a further and related object of this invention to provide a method for the production of high surface area amorphous transition metal chalcogenides which takes place at relatively normal temperatures, which avoids the difficulties and disadvantages of thermal and chemical decomposition methods as are known from the prior art and which produces a pure chalcogenide which is free of surface imperfections, oxygen contamination and water occlusions.

It is still a further and related object of this invention to provide a process which takes place rapidly and spontaneously, which produces byproducts which are easy to remove from the chalcogenide which is formed, and which does not take the length of time required by prior art methods.

It is still a further object of this invention to provide a process for the preparation of amorphous transition metal chalcogenides having a range of transition metal/chalcogen ratio and to produce such compounds having high surface area, unique amorphous characteristics and suitable for advantageous use in high activity, low weight, reversible, high current density battery systems.

It is a still further object of this invention to obtain transition metal chalcogenides which have small crystal size, the capability of substantial lithium intercalation, which permit copolymerization reactions and doping reactions and which have a wide range of utility in battery systems.

These and other advantages of the invention are achieved in a process for the direct synthesis of high surface area amorphous chalcogenides of transition metals selected from Group IV, V, VI and VII elements, particularly molybdenum, tungsten, and titanium. The process, which is characterized by a covalent exchange mechanism, includes the following steps. A mixture is formed of (a) a halide of one of the aforesaid transition metals having the formula $MY_n$ where Y is chlorine, bromine, fluorine or iodine, and n is 3, 4, 5 or 6, and (b) a source of chalcogen selected from a compound having the formula $(R)_3Si-X-Si(R)_3$ wherein R is alkyl having from 1-4 carbon atoms and X is sulfur, selenium or tellurium. The mixture may be reacted directly as described below or in an inert, nonionic solvent such as benzene, toluene, methylene chloride, tetrahydrofuran and other known solvent species. Reaction takes place spontaneously at a temperature of from $-77°$ C. to $+160°$ C. and thereafter the transition metal chalcogenide is removed from the mixture and washed to remove unreacted compounds and the byproducts of the reaction.

The reaction can be broadly stated as follows:

wherein M is a transition metal selected from the Group IVA, VA, VIA and VIIA elements, Y is chlorine, bromine, fluorine or iodine, R is alkyl having from 1-4 carbon atoms (it being understood that the three substituents on each of the silica atoms on the source of chalcogen can be the same or different alkyl groups having one to four carbon atoms and that one of such R groups on each carbon atom may be hydrogen) and X is sulfur, selenium or tellurium. In the preferred embodiments, the process employs molybdenum compounds ($MoX_4$, $MoX_5$ or $MoX_6$) where X is the aforementioned halide and reacts same with hexamethyl disilathiane (R is methyl, X is sulfur) or hexamethyl disilaselenane (R is methyl, X is selenium).

The reaction commences instantaneously at room temperature (25° C.) and also at lower and at elevated temperatures. It proceeds rapidly to completion. The only byproducts of the reaction are the respective trialkylsilyl halides which are readily removed from the amorphous chalcogenides by washing in an inert nonionic solvent such as tetrahydrofuran.

It is desirable to use excess hexaalkyl disilathiane or hexaalkyl disilaselenane in order to produce the desired amount of totally sulfurized or selenized compound. Failure to use excess source of chalcogen may also result in the formation of chlorosulfides.

With the process of the invention, it is possible to produce the desired amorphous, high surface area chalcogenide with a controlled particle size, crystallinity and doping flexibility. It has been found that the amorphous compounds of the invention are characterized by X-ray, Raman and infrared techniques and that they are compounds which have not heretofore been produced. The advantage of low temperature reaction is that one obtains small crystals, this being advantageous in the intended use of the chalcogenides for batteries. The small crystals permit infusion and intercalation of lithium ions into the chalcogenide when used as a cathode material.

Employing the method of the invention, it is possible to avoid oxygen or water contamination of the process materials and the resultant chalcogenides. There is no surface contamination, no oxidized species on the surface or within the interior of the material and the all important surface area is subject to the control of the skilled worker.

In contrast to prior art reactions, the novel reactions of the invention can take place in as little as ten minutes. The byproducts, which may be gaseous at the reaction temperature, are easily removed by physical-chemical techniques or by simple washing in a number of suitable nonionic, inert solvents.

By proper choice of the reactants and their relative amounts, it is possible to obtain a range of unique high surface amorphous species. It has been possible to prepare the unique amorphic form of $MoS_3$ by the reaction $MoF_6 + (CH_3)Si-S-Si(CH_3)_3 \rightarrow MoS_3 + 6(CH_3)_3SiF$.

Likewise, by substituting MoCl$_5$ for MoF$_6$, it is possible to obtain a unique amorphous form of MoS$_{2.5}$. Similarly, it is possible to produce MoS$_2$, WS$_3$, WS$_{2.5}$ and other compounds.

The use of the chalcogenides in primary and secondary batteries, particularly those employing lithium as an anode, is referred to above. The chalcogenides may be apt replacements for D cell batteries and other batteries for a wide range of industrial, consumer, space, and military applications. They may also be used as catalysts, e.g., for hydrodesulfurization reactions.

The chalcogenides of the invention have high activity, relatively low weight, and are reversible, that is, lithium atoms which become intercalated into the cathode material can be removed. The chalcogenides also operate at high current density. It has been found that MoS$_3$ is a satisfactory alternative to TiS$_2$ in that the battery reaction yields Li$_x$MoS$_3$ where x is equal to approximately 4. This capability of intercalating lithium atoms suggests that the chalcogenides of the invention may be used advantageously in a range of battery applications. The removal of the lithium atoms is reversible and the rate at which charges and discharges can be made onto molybdenum chalcogenides according to the invention is believed to be greater than in molybdenum chalcogenides having the same stochiometry but prepared according to the thermal or chemical decomposition methods taught in the prior art. This better performance characteristic is believed to be the result of higher surface purity, smaller crystals, and less water or oxygen occlusions.

The compounds prepared according to the invention can be prepared as thin films or they can be employed with mesh electrodes such as carbon. Their greater activity lends them to use in a number of applications which are not open to the prior art compounds.

The process of the invention and the amorphous, high surface area chalcogenides obtained thereby are described in the following examples.

EXAMPLE I

Amorphous MoS$_2$ has been prepared from Mo$^{IV}$X$_4$ (X=Cl, Br, I) reacted with hexamethyl disilathiane[I] either directly or using a nonreactive solvent (such as CH$_2$Cl$_2$, C$_6$H$_6$, etc.) in the molar ratio [I]/MoX$_4$ of at least 2/1 to assure complete reaction. The reaction temperature in several runs varied from $-77°$ to $+160°$ C. and the reaction in each instance was completed in less than two hours. The product obtained was washed with freshly distilled tetrahydrofuran to assure removal of any unreacted MoX$_4$ or any partially sulfurized material.

The material obtained shows a molybdenum percentage obtained by atomic absorption of $60\pm2\%$ and a sulfur percentage measured by gravimetric sulfide of $40\pm2\%$. X-ray fluorescence indicates no residual silicon and only small amounts of chlorine (1%). The magnetic susceptibility measured by a Faraday balance is diamagnetic as is expected for MoS$_2$. Powder X-ray diffraction shows only very broad diffraction peaks consistent with an amorphous material. Raman spectra show no peaks corresponding to crystalline MoS$_2$.

EXAMPLE II

Amorphous MoSe$_2$ has been prepared from Mo$^{IV}$X$_4$ (X=Cl, Br, I) reacted with hexamethyl disilaselenane-[II] either directly or using a nonreactive solvent (such as CH$_2$Cl$_2$, C$_6$H$_6$, etc.) in the molar ratio (II/MoX$_4$) of at least 2/1 to assure complete reaction. The reaction temperature in several runs varied from $-77°$ to $+160°$ C. and the reaction in each instance was completed in less than two hours. The product obtained was washed with freshly distilled tetrahydrofuran to assure removal of any unreacted MoX$_4$ or any partially sulfurized material.

The material obtained shows a molybdenum percentage obtained by atomic absorption of $38\pm2\%$ and a selenium percentage measured by gravimetric selenium of $61\pm2\%$. The relative ratio of selenium to molybdenum was verified by X-ray fluorescence. The samples were diamagnetic as measured in a Faraday balance, as is expected for MoSe$_2$. Powder X-ray diffraction showed only very broad diffraction peaks consistent with amorphous MoSe$_2$.

EXAMPLE III

Mo$_2$S$_5$ has been prepared from Mo$^V$Cl$_5$ reacted with hexamethyl disilathiane[I] either directly or using a nonreactive solvent (such as CH$_2$Cl$_2$, C$_6$H$_6$, etc.) in the molar ratio [I]/MoCl$_5$ of at least 5/2 to assure complete reaction. The reaction temperature in several runs varied from $-77°$ to $+160°$ C. and the reaction in each instance was completed in less than two hours. The product obtained was washed with freshly distilled tetrahydrofuran to assure removal of any unreacted MoX$_4$ or any partially sulfurized material.

The material obtained shows a molybdenum percentage obtained by atomic absorption of $54\pm2\%$ and a sulfur percentage of $45\pm2\%$ as determined by gravimetric sulfide. The samples were diamagnetic as measured in a Faraday balance, as may be expected for a molybdenum dimer. Powder X-ray diffraction showed only very broad diffraction peaks. Differential thermal analysis and thermal gravimetric analysis indicated that this material is thermally stable under inert atmosphere to at least 350° C.; by 400° C. the loss of sulfur and formation of crystalline MoS$_2$ occurs. The Raman spectrum showed no peaks indicative of crystalline material.

EXAMPLE IV

Amorphous Mo$_2$Se$_5$ has been prepared from Mo$^V$Cl$_5$ reacted with hexamethyl disilaselenane[II] either directly or using a nonreactive solvent (such as CH$_2$Cl$_2$, C$_6$H$_6$, etc.) in the molar ratio [II]/MoC$_{15}$ of at least 5/2. The reaction temperature in several runs varied from $-77°$ to $+160°$ C. and the reaction in each instance was completed in less than two hours. The product obtained was washed with freshly distilled tetrahydrofuran to assure removal of any unreacted MoX$_4$ or any partially sulfurized material.

The material obtained shows a molybdenum percentage obtained by atomic absorption of $32\pm2\%$ and a selenium percentage of $57\pm2\%$ determined gravimetrically. The samples were diamagnetic as measured in a Faraday balance as may be expected for a molybdenum dimer. Powder X-ray differentiation showed only very broad diffraction peaks.

EXAMPLE V

Amorphous MoS$_3$ has been prepared from Mo$^{VI}$F$_6$ reacted with hexamethyl disilathiane[I] either directly or using a nonreactive solvent (such as CH$_2$Cl$_2$, C$_6$H$_6$, etc.) in the molar ratio of [I]/MoF$_6$ of at least 3/1. The reaction temperature in several runs varied from $-77°$ to $+160°$ C. and the reaction in each instance was completed in less than two hours. The product obtained was washed with freshly distilled tetrahydrofuran to assure removal of any unreacted $MoX_6$ or any partially sulfurized material.

The material obtained shows a molybdenum percentage obtained by atomic absorption of 50±2% and a sulfur percentage of 49±2% determined gravimetrically. The samples were diamagnetic as might be expected for $Mo^{VI}$ compounds. Powder X-ray differentiation showed only very broad diffraction peaks.

EXAMPLE VI

Amorphous $MoSe_3$ has been prepared from $MoF_6$ reacted with hexamethyl disilaselenane[II] either directly or using a nonreactive solvent (such as $CH_2Cl_2$, $C_6H_6$, etc.) in the molar ratio of [II]/$MoF_6$ of at least 3/1. The reaction temperature in several runs varied from $-77°$ to $+160°$ C. and the reaction in each instance was completed in less than two hours. The product obtained was washed with freshly distilled tetrahydrofuran to assure removal of any unreacted $MoX_4$ or any partially sulfurized material.

The material obtained shows a molybdenum percentage obtained by atomic absorption of 28±2% and a selenium percentage of 71±2% determined gravimetrically. The samples were diamagnetic as might be expected for $Mo^{VI}$ compounds. Powder X-ray differentiation showed only very broad diffraction peaks.

What is claimed is:

1. A process for the direct synthesis of X-ray amorphous sulfides or selenides of molybdenum comprising the steps of:
(1) forming a mixture of:
   (a) a halide of molybdenum having the formula $MoY_n$ where Y is chlorine, bromine, fluorine of iodine and n is 4,5 or 6, and
   (b) a source of sulfur or selenium selected from: (i) hexamethyl disilathiane or (ii) hexamethyl disilaselenane,
(2) reacting the mixture formed in (1) at a temperature of from $-77°$ C. to $+160°$ C.; and
(3) separating the molybdenum sulfide or selenide formed in step (2).

2. The process of claim 1 wherein a stochiometric excess of hexamethyl disilathiane or hexamethyl disilaselenane is employed.

3. A process as recited in claim 1 wherein the reaction mixture is formed in a nonreactive solvent selected from the group consisting of tetrahydrofuran, methylene chloride, carbon disulphide, benzene, and toluene.

4. A process as recited in claim 1 wherein the product obtained is washed with a solvent to remove any unreacted molybdenum halide or byproducts of the reaction.

5. A process for the direct synthesis of amorphous sulfides, selenides or tellurides of transition metals selected from Group IV, V, VI and VII elements, comprising the steps of:
(1) forming a mixture of:
   (a) a halide of a said transition metal having the formula $MY_n$ where Y is chlorine, bromine, fluorine, or iodine, and n is 3, 4, 5 or 6, and
   (b) a compound having the formula $(R)_3Si-X-Si(R)_3$ wherein R is alkyl having from 1-4 carbon atoms and X is sulfur, selenium or tellurium,
(2) reacting said mixture at a temperature of $-77°$ C. to $+160°$ C.;
(3) separating the transition metal sulfide, selenide or telluride formed in step (2) from the reaction mixture; and
(4) washing said transition metal sulfide, selenide or telluride with an inert solvent to remove unreacted materials and the byproducts of the reaction.

6. A process as recited in claim 5 wherein a stochiometric excess of $(R)_3Si-X-Si(R)_3$ is employed.

7. A process as recited in claim 6 wherein the stochiometric ratio of $(R)_3Si-X-Si(R)_3$ is at least 1.5/1 with respect to the transition metal halide.

8. A process as recited in claim 5 wherein the reaction mixture is added to an inert, nonionic solvent and the reaction takes place therein.

9. A process for the direct synthesis of X-ray amorphous molybdenum compounds of the formula $Mo_yX_z$ where X is sulfur, selenium or tellurium, y is 1-2, and z is 2-6, y/x being not less than 2 and not more than 3, comprising the steps of:
(1) forming a mixture of
   (a) a halide of molybdenum having the formula $MoY_n$ where Y is chlorine, bromine, fluorine or iodine, and n is 4, 5 or 6, and
   (b) a compound having the formula $(RO_3Si-X-Si(R)_3$ where R is alkyl having 1-4 carbon atoms and X is sulfur, selenium or tellurium,
(2) reacting said mixture at a temperature of $-77°$ C. to $+160°$ C.;
(3) separating the molybdenum sulfide, selenide or telluride formed in step (2) from the reaction; and
(4) washing said molybdenum sulfide, selenide or telluride with an insert, nonionic solvent to remove unreacted compounds and the byproducts of the reaction.

10. A process as recited in claim 9 wherein a stochiometric excess of $(R)_3Si-X-Si(R)_3$ with respect to molybdenum halide is employed.

11. A process as recited in claim 9 wherein the reaction mixture is added to an inert, nonionic solvent and the reaction takes place therein.

* * * * *

UNITED STATES PATENT AND TRADEMARK OFFICE
CERTIFICATE OF CORRECTION

PATENT NO.   : 4,801,441
DATED        : January 31, 1989
INVENTOR(S)  : Donald Schleich It is certified that error appears in the above-identified patent and that said Letters Patent is hereby corrected as shown below:

Claim 9, column 8, line 37, change "$(RO_3Si-X-)$" to --$(R)_3Si-X$---;

line 45, change "insert" to --inert--.

Signed and Sealed this

Eighth Day of August, 1989

Attest:

DONALD J. QUIGG

Attesting Officer

Commissioner of Patents and Trademarks